United States Patent
Juenemann et al.

(10) Patent No.: US 10,956,323 B2
(45) Date of Patent: Mar. 23, 2021

(54) NVDIMM EMULATION USING A HOST MEMORY BUFFER

(71) Applicant: Intel Corporation, Santa Clara, CA (US)

(72) Inventors: Dale J. Juenemann, North Plains, OR (US); James A. Boyd, Hillsboro, OR (US); Robert J. Royer, Jr., Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 154 days.

(21) Appl. No.: 15/976,795

(22) Filed: May 10, 2018

(65) Prior Publication Data

US 2019/0042414 A1 Feb. 7, 2019

(51) Int. Cl.
*G06F 12/08* (2016.01)
*G06F 12/0804* (2016.01)
*G06F 3/06* (2006.01)

(52) U.S. Cl.
CPC .......... *G06F 12/0804* (2013.01); *G06F 3/065* (2013.01); *G06F 3/0619* (2013.01); *G06F 3/0656* (2013.01); *G06F 3/0664* (2013.01); *G06F 3/0679* (2013.01); *G06F 2212/1032* (2013.01)

(58) Field of Classification Search
CPC ...... G06F 3/0679; G06F 3/0656; G06F 9/461; G06F 9/5022; G06F 3/0617; G06F 11/2094; G06F 9/544; G06F 11/1451; G06F 11/1469; G06F 16/10
See application file for complete search history.

(56) References Cited

U.S. PATENT DOCUMENTS

| | | | | |
|---|---|---|---|---|
| 9,652,405 | B1* | 5/2017 | Shain | G06F 12/122 |
| 10,261,709 | B2* | 4/2019 | Suryanarayana | G06F 3/0619 |
| 2014/0026019 | A1* | 1/2014 | Sawada | G06F 11/1441 |
| | | | | 714/773 |
| 2017/0060706 | A1* | 3/2017 | Kinoshita | G06F 11/1666 |
| 2017/0212835 | A1* | 7/2017 | Hu | G06F 12/0246 |
| 2017/0286285 | A1* | 10/2017 | Berke | G06F 12/0868 |
| 2017/0351626 | A1* | 12/2017 | Lalam | G06F 13/4027 |

(Continued)

OTHER PUBLICATIONS

Intel, Intel and Micron Produce Breakthrough Memory Technology, Jul. 28 2015, Intel News Releases (Year: 2015).*

*Primary Examiner* — Ryan Bertram
(74) *Attorney, Agent, or Firm* — Jaffery Watson Mendonsa & Hamilton LLP

(57) ABSTRACT

Examples include techniques for emulating a non-volatile dual inline memory module (NVDIMM) in a computing platform using a non-volatile storage device. When a power up event occurs for the computing platform, a host memory buffer may be allocated in a system memory device and a backing store for the host memory buffer may be copied from the non-volatile storage device to the host memory buffer in the system memory device. When a power down event or a flush event occurs for the computing platform, the host memory buffer may be copied from the system memory device to the corresponding backing store for the host memory buffer in the non-volatile storage device. Thus, virtual NVDIMM functionality may be provided without having NVDIMM hardware in the computing platform.

16 Claims, 6 Drawing Sheets

(56) References Cited

U.S. PATENT DOCUMENTS

| | | | | |
|---|---|---|---|---|
| 2017/0371695 A1* | 12/2017 | Sanjeepan | | G06F 3/0665 |
| 2018/0060168 A1* | 3/2018 | Kelly | | G06F 11/1048 |
| 2018/0060231 A1* | 3/2018 | Kelly | | G06F 12/0868 |
| 2018/0107596 A1* | 4/2018 | Kelly | | G06F 9/3004 |
| 2018/0143904 A1* | 5/2018 | Sweere | | G06F 3/0619 |
| 2018/0165101 A1* | 6/2018 | Bulusu | | G06F 11/1417 |
| 2018/0314441 A1* | 11/2018 | Suryanarayana | | G06F 11/00 |
| 2018/0314607 A1* | 11/2018 | Deshpande | | G06F 11/1471 |
| 2018/0321962 A1* | 11/2018 | Peddamallu | | G06F 9/5016 |
| 2018/0329643 A1* | 11/2018 | Kurjanowicz | | G06F 3/0643 |
| 2019/0121710 A1* | 4/2019 | Bulusu | | G06F 11/1666 |
| 2019/0163557 A1* | 5/2019 | Nguyen | | G11C 29/883 |
| 2019/0171580 A1* | 6/2019 | Suryanarayana | | G06F 12/0238 |
| 2019/0188596 A1* | 6/2019 | Ipek | | G06F 9/30105 |
| 2019/0340133 A1* | 11/2019 | Covelli | | G06F 12/0246 |

* cited by examiner

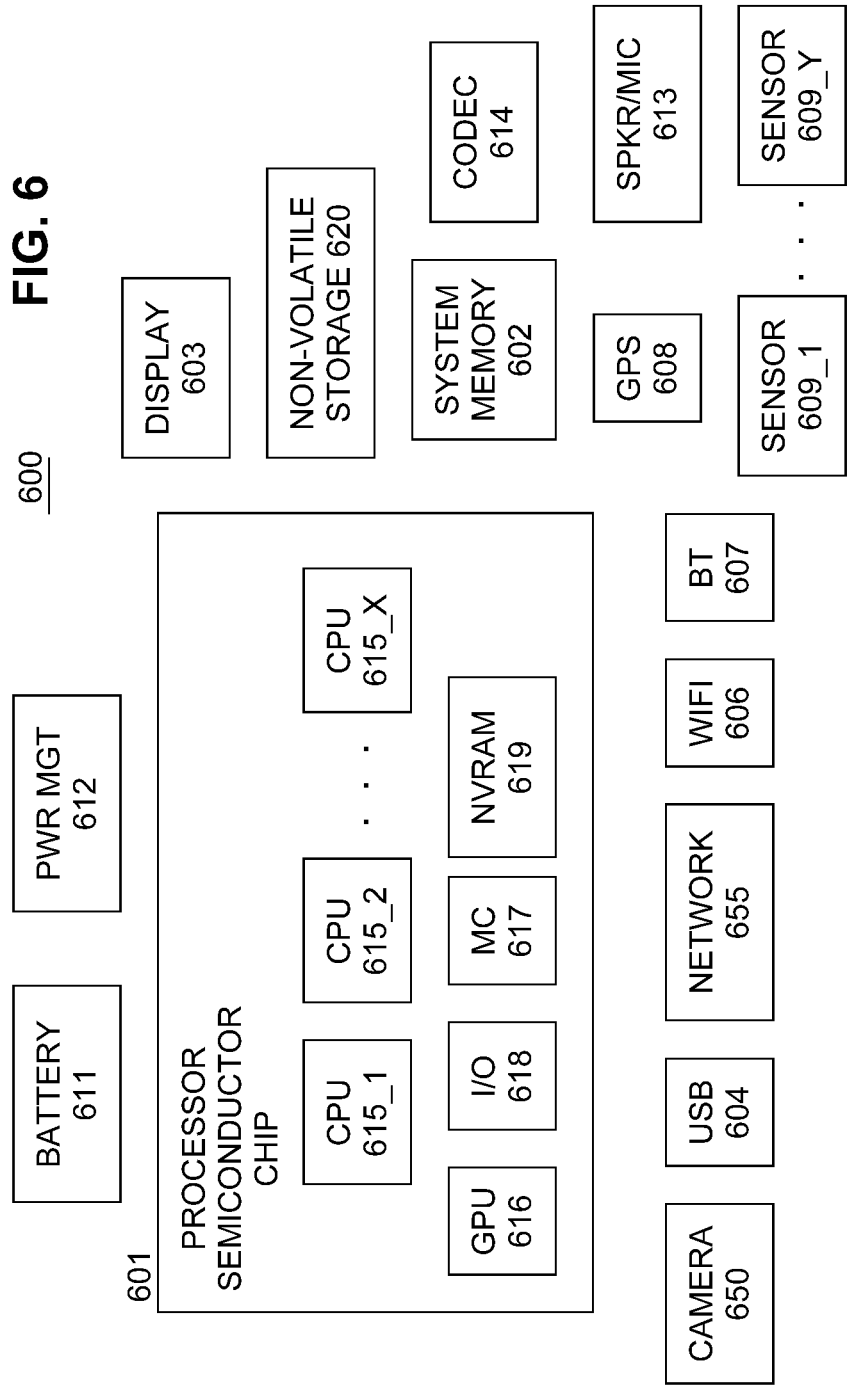

NVDIMM EMULATION USING A HOST MEMORY BUFFER

TECHNICAL FIELD

Examples described herein are generally related to techniques for emulating a persistent memory in a computing system.

BACKGROUND

In a desire for ever-faster systems, persistent memory is emerging as a technology that combines dynamic random-access memory (DRAM) and NAND flash memory to accelerate I/O on the memory bus. Generally, persistent memory can be thought of as persistent storage in a dual inline memory module (DIMM slot), accessible over the memory bus. The memory bus is as close to the CPU as possible without being part of the CPU itself, which offers the ability to deliver storage with extremely low latency In some computer systems, a persistent memory known as a non-volatile dual inline memory module (NVDIMM) is used to store data. A NVDIMM is a type of random-access memory (RAM). Non-volatile memory (NVM) is memory that retains its contents even when electrical power is removed, for example from an unexpected power loss, system crash, or normal shutdown. "Dual inline" identifies the memory as using the dual inline memory module (DIMM) package. NVDIMMs improve application performance, data security, and system crash recovery time. "Non-volatile" products may use volatile memory during normal operation and dump the contents into non-volatile memory if the power fails, using an on-board backup power source. Volatile memory is faster than non-volatile; it is byte-addressable; and it can be written to arbitrarily, without concerns about wear and device lifespan. However, including a second memory to achieve non-volatility (and the on-board backup power source) increases the product cost compared to volatile memory.

There are various types of NVDIMM implementations. One implementation, called NVDIMM-F, is DIMM with flash storage. Computer systems need to pair the storage DIMM alongside a traditional dynamic random-access memory (DRAM) DIMM. Another implementation, called NVDIMM-N, is DIMM with flash storage and traditional DRAM in the same module. The computer system accesses the traditional DRAM directly. In the event of a power failure, the module copies the data from the volatile traditional DRAM to the persistent flash storage and copies the data back when power is restored. It uses a small backup power source for this.

NVDIMMs evolved from the BBU (battery backed up) DIMM, which used a backup battery to sustain power to a volatile memory for up to 72 hours. However, batteries are disfavored in computer system components because they have a limited lifespan, they may be regarded as hazardous waste, and they contain heavy metals. When the DIMM includes non-volatile memory, backup power is required for only a short time after the computer system's main power fails, while the DIMM copies the data from volatile to non-volatile memory. Therefore, modern NVDIMMs use on-board supercapacitors to store energy.

Currently, NVDIMM storage devices are designed to behave like traditional DRAM modules and are accessed in a similar way using load/store instructions. However, existing solutions are limited to large scale computer server environments, are expensive, and have limited capacities. They also require special power domains and mechanisms to ensure that power is maintained during any data movement to the NVM to ensure persistency.

BRIEF DESCRIPTION OF THE DRAWINGS

FIG. 6 illustrates an example computing system.

DETAILED DESCRIPTION

As contemplated in the present disclosure, instead of using a NVDIMM, existing computing system components such as solid-state storage devices (SSDs) may be used to emulate a persistent memory sometimes known as Storage Class Memory (SCM). SCM products offer a slightly different approach to the use of NAND in that they extend the apparent capacity of a standard DIMM by using NAND memory as a backing store and DRAM as a cache for active data. This gives the ability to deploy servers with very high DRAM capacities and at a lower cost than using traditional DRAM alone. SCM solutions look and operate like standard DRAM and don't require any basic input/output system (BIOS) or operating system (OS) changes to implement in a computing platform. SCM provides capacity and economics similar to storage, but with performance that is similar to memory.

Embodiments of the present invention provide the benefits of direct access, via processor load and store instructions, to SCM in a "virtual" or emulated NVDIMM without the need for modification to hardware components associated with the motherboard, platform control hub (PCH), or processor. Because the functionality of a NVDIMM is provided without actually using a NVDIMM, the cost of the computing system is lower, existing software interfaces may be used, and no special power domains are required.

Figure 1:
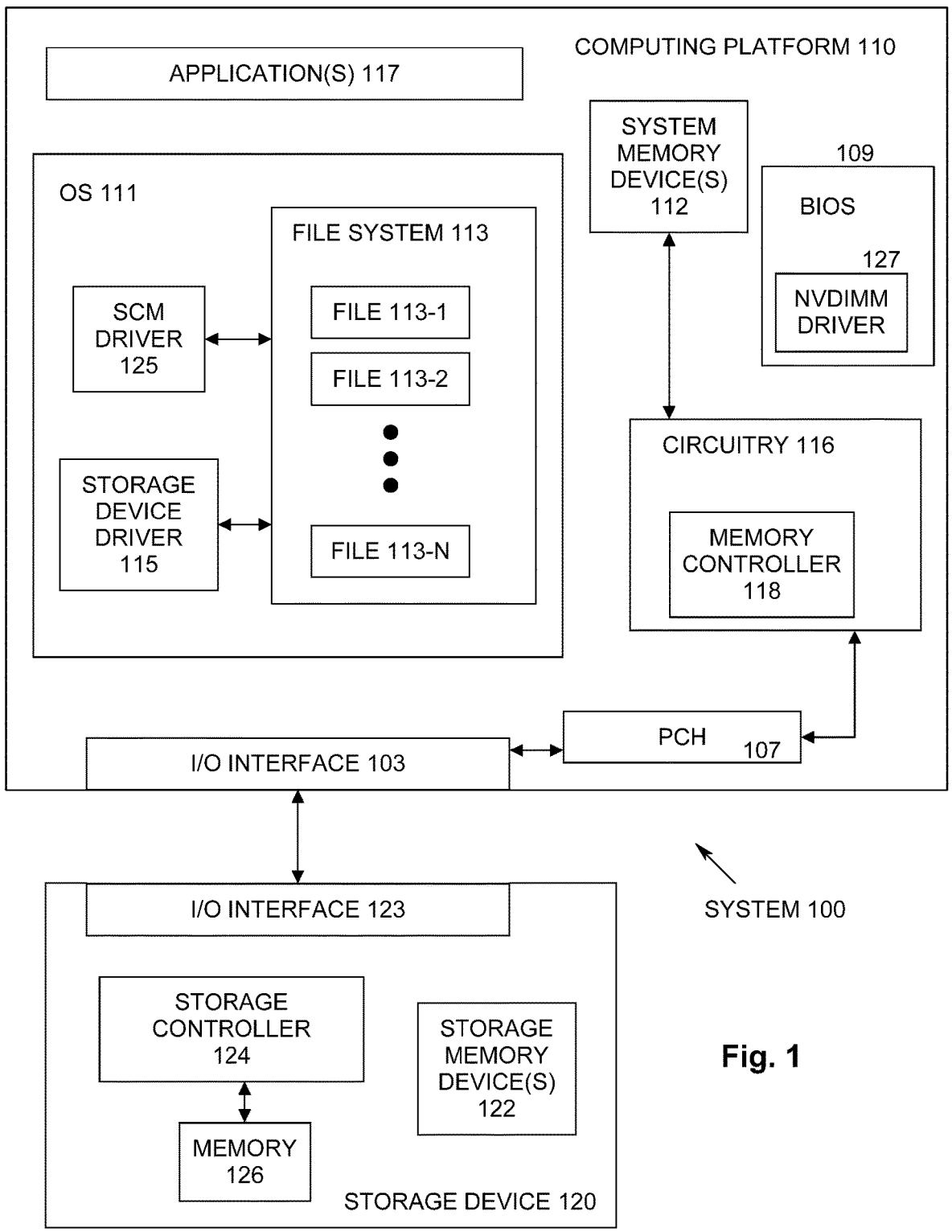
FIG. 1 illustrates an example computing system.

FIG. 1 illustrates an example system 100. In some examples, as shown in FIG. 1, system 100 includes a computing platform 110 coupled to a storage device 120 through I/O interface 103 and I/O interface 123. Computing platform 110 may include a basic input/output system (BIOS) 109, an operating system (OS) 111, one or more system memory device(s) 112, circuitry 116, a PCH 107, and one or more application(s) 117. For these examples, circuitry 116 may be capable of executing various functional elements of computing platform 110 such as BIOS 109, OS 111, and/or application(s) 117 that may be maintained, at least in part, within system memory device(s) 112. Circuitry 116 may include host processing circuitry to include one or more central processing units (CPUs), each having one or more processing cores, and associated chipsets and/or controllers, such as memory controller 118. The processor or processor circuitry 116 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 116 may also include one or more application-specific integrated circuits (ASICs) and at least some components may be implemented as hardware elements of these ASICs. In some embodiments, BIOS 109 may be firmware complying with the Unified Extensible Firmware Interface (UEFI) specification version 2.7 published May 2017, or later revisions.

According to some examples, as shown in FIG. 1, OS 111 may include a file system 113, a Storage Class Memory (SCM) driver 125, and a storage device driver 115 and storage device 120 may include a storage controller 124, one or more storage memory device(s) 122 and memory 126. OS 111 may be arranged to implement SCM driver 125 to coordinate at least temporary storage of data for a file from among files 113-1 to 113-*n*, where "n" is any whole positive integer>1, as SCM in system memory device(s) 112. In an embodiment, SCM driver may use NVDIMM driver 127 within BIOS 109 to read data from and write data to SCM. The data, for example, may have originated from or may be associated with executing at least portions of application(s) 117 and/or OS 111. OS 111 may also be arranged to implement storage device driver 115 to coordinate at least temporary storage of data for a file from among files 113-1 to 113-*n*, where "n" is any whole positive integer>1, to storage memory device(s) 122 within storage device 120. The data, for example, may have originated from or may be associated with executing at least portions of application(s) 117 and/or OS 111. As described in more detail below, BIOS 109 and/or OS 111 communicates one or more commands and transactions with storage device 120 to read data from and/or write data to storage device 120. The commands and transactions may be organized and processed by logic and/or features at the storage device 120 to implement read transactions to read data from and/or write transactions to write the data to storage device 120.

In some examples, storage controller 124 may include logic and/or features to receive a read transaction request and/or a write transaction request to storage memory device (s) 122 at storage device 120. For these examples, the read write transaction and/or write transaction request may be initiated by or sourced from an application such as application(s) 117 that utilizes file system 113 to write data to storage device 120 through input/output (I/O) interfaces 103 and 123. In some examples, data stored in system memory device(s) 112, particularly SCM as discussed below, may be read from or written to storage device 120, using circuitry 116, PCH 107, and I/O interfaces 103, 123.

In some examples, memory 126 may include volatile types of memory including, but not limited to, RAM, D-RAM, DDR SDRAM, SRAM, T-RAM or Z-RAM. One example of volatile memory includes DRAM, or some variant such as SDRAM. A memory subsystem as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

However, examples are not limited in this manner, and in some instances, memory 126 may include non-volatile types of memory, whose state is determinate even if power is interrupted to memory 126. In some examples, memory 126 may include non-volatile types of memory that is a block addressable, such as for NAND or NOR technologies. Thus, a memory 126 can also include a future generation of types of non-volatile memory, such as a 3-dimensional cross-point memory (3D XPoint™), or other byte addressable non-volatile types of memory. According to some examples, the memory 126 may include types of non-volatile memory that includes chalcogenide glass, multi-threshold level NAND flash memory, NOR flash memory, single or multi-level Phase Change Memory (PCM), a resistive memory, nanowire memory, FeTRAM, MRAM that incorporates memristor technology, or STT-MRAM, or a combination of any of the above, or other memory.

In some examples, storage memory device(s) 122 may be a device to store data from write transactions and/or write operations. Storage memory device(s) 122 may include one or more chips or dies having gates that may individually include one or more types of non-volatile memory to include, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM. For these examples, storage device 120 may be arranged or configured as a solid-state drive (SSD). The data may be read and written in blocks and a mapping or location information for the blocks may be kept in memory 126.

Examples are not limited to storage devices arranged or configured as SSDs, other storage devices such as a hard disk drive (HDD) are contemplated. In these instances, the storage memory device (s) 122 may include one or more platters or rotating disks having a magnet material to store data.

According to some examples, communications between storage device driver 115 and storage controller 124 for data stored in storage memory devices(s) 122 and accessed via files 113-1 to 113-*n* may be routed through I/O interface 103 and I/O interface 123. I/O interfaces 103 and 123 may be arranged as a Serial Advanced Technology Attachment (SATA) interface to couple elements of host computing platform 110 to storage device 120. In another example, I/O interfaces 103 and 123 may be arranged as a Serial Attached Small Computer System Interface (SCSI) (or simply SAS) interface to couple elements of host computing platform 110 to storage device 120. In another example, I/O interfaces 103 and 123 may be arranged as a Peripheral Component Interconnect Express (PCIe) interface to couple elements of host computing platform 110 to storage device 120. In another example, I/O interfaces 103 and 123 may be arranged as a Non-Volatile Memory Express (NVMe) interface to couple elements of computing platform 110 to storage device 120. For this other example, communication protocols may be utilized to communicate through I/O interfaces 103 and 123 as described in industry standards or specifications (including progenies or variants) such as the Peripheral Component Interconnect (PCI) Express Base Specification, revision 3.1, published in November 2014 ("PCI Express specification" or "PCIe specification") or later revisions, and/or the Non-Volatile Memory Express (NVMe) Specification, revision 1.3a, also published in October 2017 ("NVMe specification") or later revisions (available at www.nvmexpress.org).

In some examples, system memory device(s) 112 may store information and commands which may be used by circuitry 116 for processing information. Also, as shown in FIG. 1, circuitry 116 may include a memory controller 118. Memory controller 118 may be arranged to control access to data at least temporarily stored at system memory device(s) 112 for eventual storage to storage memory device(s) 122 at storage device 120.

In some examples, storage device driver 115 may include logic and/or features to forward commands associated with one or more read and/or write transactions and/or read and/or write operations originating from application(s) 117, OS 111 and/or BIOS 109. For example, the storage device driver 115 may forward commands associated with write transactions such that data may be caused to be stored to storage memory device(s) 122 at storage device 120. More specifically, storage device driver 115 can enable communication of the write operations from application(s) 117, OS 111, and/or BIOS 109 at computing platform 110 to controller 124.

System Memory device(s) 112 may include one or more chips or dies having volatile types of memory such RAM, D-RAM, DDR SDRAM, SRAM, T-RAM or Z-RAM. However, examples are not limited in this manner, and in some instances, system memory device(s) 112 may include non-volatile types of memory, including, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM.

In some examples, SCM driver 125 may include logic and/or features to forward commands associated with one or more read and/or write transactions and/or read and/or write operations originating from application(s) 117, OS 111 and/or or BIOS 109. For example, SCM driver 125 may forward commands associated with write transactions such that data may be caused to be stored to and retrieved from SCM (i.e., virtual NVDIMM) in system memory device(s) 112.

In some embodiments, computing platform 110 may include a platform battery to ensure that no sudden loss of power may cause a failure to backup data from the virtual NVDIMM.

According to some examples, computing platform 110 may include, but is not limited to, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, or combination thereof.

Figure 2:
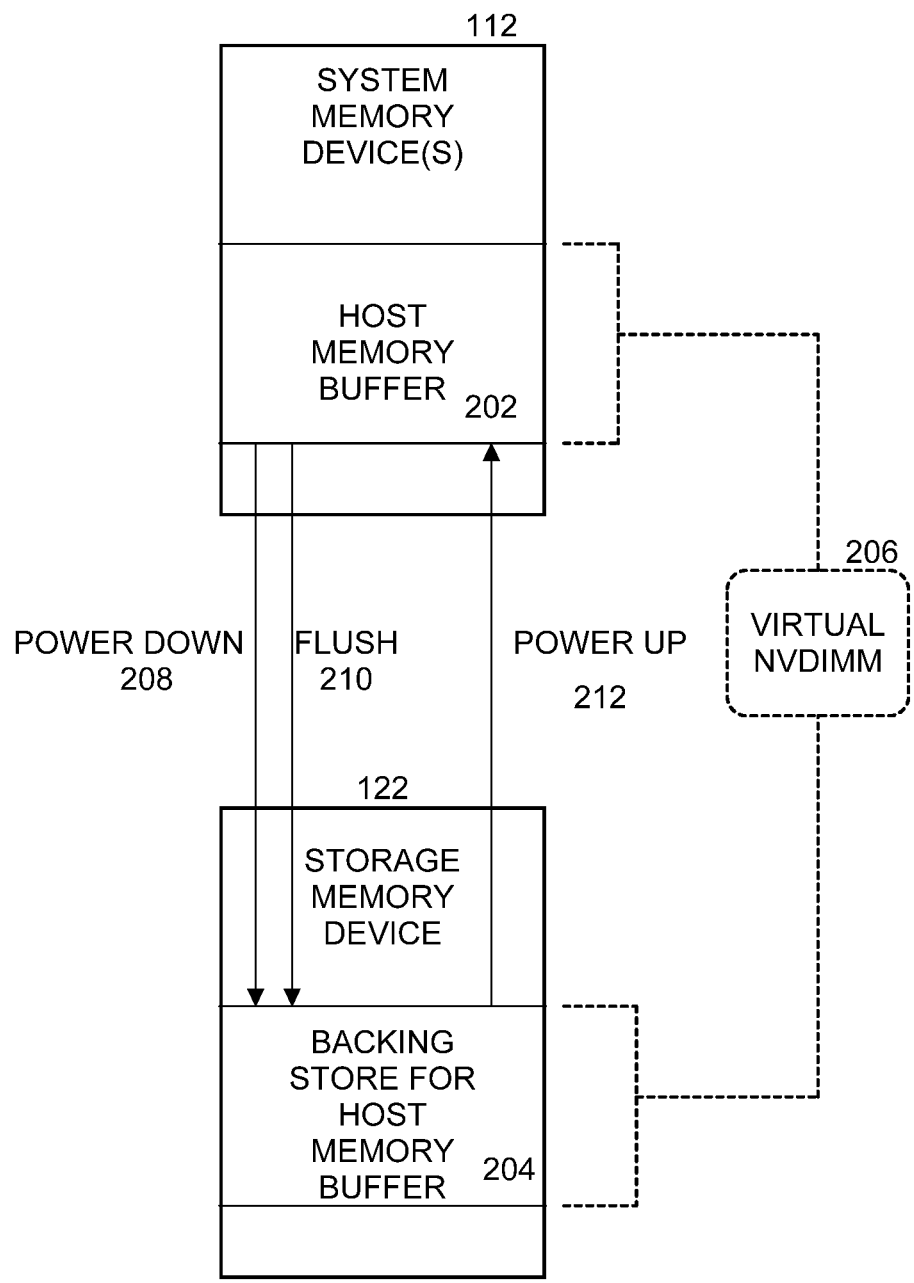
FIG. 2 illustrates an example of a virtual NVDIMM.

FIG. 2 illustrates an example of a virtual NVDIMM. Instead of providing a NVDIMM in computing platform 110, the functionality of a NVDIMM may be provided in embodiments of the present invention by logic for a virtual DIMM 206. In an embodiment, a portion of system memory device(s) 112 may be allocated to store a host memory buffer (HMB) 202. Application(s) 117, by accessing OS 111 (which uses SCM driver 125), may treat HMB 202 as storage class memory (SCM) and thus write data to and read data from HMB 202 in system memory device 112. Since system memory device(s) 112 is volatile, ordinarily any data stored in HMB 202 would be lost if power is lost to the computing platform. However, in embodiments of the present invention, this outcome may be avoided by backing up HMB 202 to a corresponding area in non-volatile storage memory device 122. This area, called backing store for host memory buffer 204, may be written to and/or read from as a result of the occurrence of specific events. In an embodiment, the size of HMB 202 and the size of backing store for HMB 204 may be the same. In another embodiment, the size of HMB 202 may be larger than backing store for HMB 204, for example if some compression technologies were used to compress backing store for HMB 204 on storage memory device 122. If a power down event 208 occurs, HMB 202 may be copied to backing store for HMB 204. If OS 111 implements a flush event 210 to flush the contents of HMB 204, HMB 202 may be copied to backing store for HMB 204. If a power up event 212 occurs, backing store for HMB 204 may be copied to HMB 202, to restore the HMB as it was before a power down event occurred.

Figure 3:
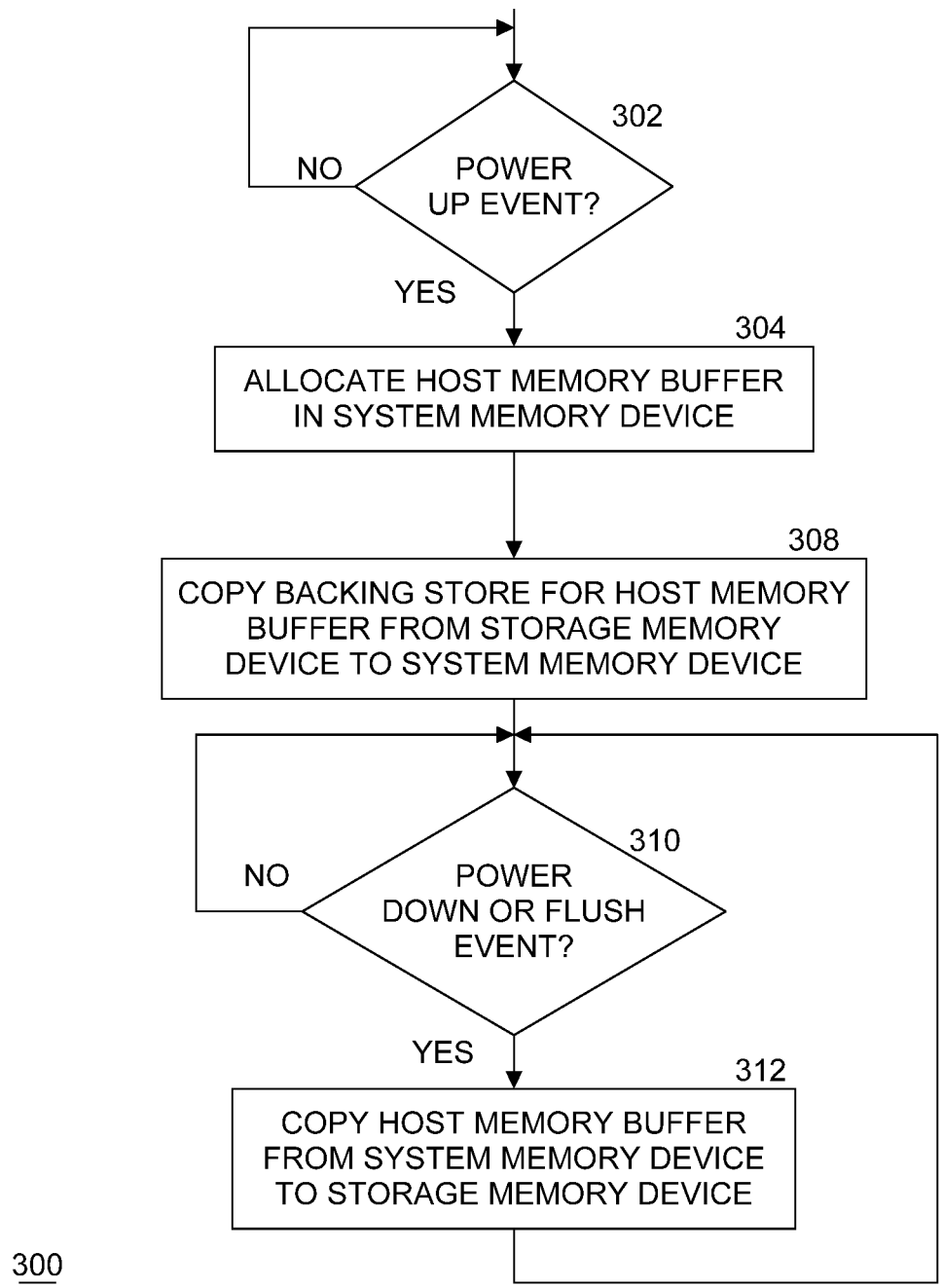
FIG. 3 illustrates an example of a first logic flow.

FIG. 3 illustrates an example of a first logic flow. FIG. 3 illustrates a high-level logic for implementing a virtual NVDIMM. Processing may begin with the computing platform in a powered off state. At block 302, during boot processing of the computing platform, BIOS 109 may detect a power up event (i.e., the computing platform is being booted up). As part of the computing platform initialization process, at block 304 BIOS 109 may allocate space for host memory buffer (HMB) 202 in system memory device 112. Next, at block 308 backing store for HMB 204 may be copied from storage memory device 122 on non-volatile storage device 120 to HMB 202 on system memory device 112, thereby restoring a previously backed up HMB (if any). At a later point in time while computing platform 110 is running, BIOS 109 may determine if a power down or a flush event has occurred at block 310. If so, BIOS 109 may copy HMB 202 from system memory device 112 to backing store for HMB 204 on storage memory device 122 of non-volatile storage device 120 at block 312, thereby creating a non-volatile backup of HMB 202. If the event was a flush event, processing by computing platform 110 may continue. If the event was a power down event, processing by computing platform 110 ends until a subsequent power up.

Figure 4:
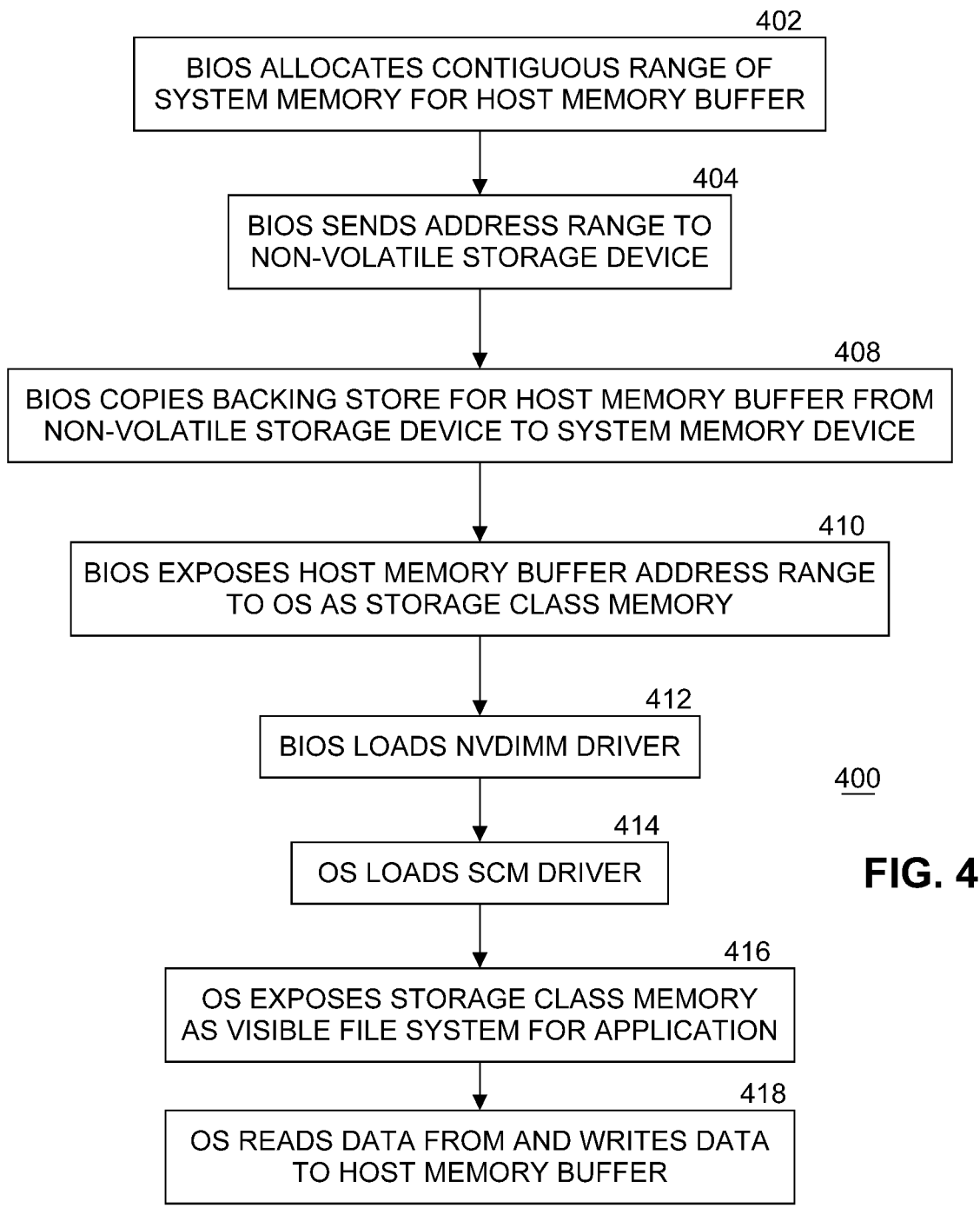
FIG. 4 illustrates an example of a second logic flow.

FIG. 4 illustrates an example of logic for booting a computing platform implementing a virtual NVDIMM. In embodiments of the present invention, BIOS 109 allocates a contiguous physical address range as Host Memory Buffer 202 as defined in the Non-Volatile Memory Express (NVMe) Specification, revision 1.3a, published in October 2017 ("NVMe specification") or later revisions, available at www.nvmexpress.org). BIOS then describes those physical addresses as a NVDIMM byte addressable, non-volatile address range via Advanced Configuration and Power Interface (ACPI) NVDIMM Firmware Interface Tables (NFIT) (as defined in the specification for ACPI 6.0, dated April 2015 and later revisions, available at www.uefi.org). The computing platform will see that the system has Storage Class Memory (SCM) and load the appropriate Unified Extensible Firmware Interface (UEFI) and OS drivers for accessing this range.

By utilizing the Host Memory Buffer, any DRAM technology or double data rate (DDR) memory controller hardware on the computing platform may be used. A slightly modified storage device 120 can be updated to manage the Host Memory Buffer as a SCM access mechanism. Thus, well defined interfaces and mechanisms may be utilized to provide the benefits of low latency, non-volatile SCM on the computing platform without using a NVDIMM, particularly for mobile platforms which may not have physical slots available for insertion of NVDIMMs.

During booting/initialization of computing platform 110 on power up (e.g., state S5 or S4 to S0), as part of BIOS boot processing at block 402 BIOS 109 allocates a contiguous range of system memory in system memory device 112 (i.e., physical DRAM) for the host memory buffer 202. The address range is in the system physical address space of the system memory. At block 404, BIOS 109 sends the address range to the non-volatile storage device 120. In an embodiment, the address ranges may be sent to the storage device using mechanisms and an interface as defined in the NVMe v1.3 specification. In an embodiment, additional mechanisms to convey SCM usage of the Host Memory Buffer may need to be sent from the storage device to OS 111. At block 408, BIOS 109 copies backing store for Host Memory Buffer 204 (storing a previously backed up copy of Host Memory Buffer 202) to Host Memory Buffer 202 in system memory device 112.

In an embodiment, storage device 120 does not expose the address range for the backing store for Host Memory Buffer 204 via an NVMe namespace or any other mechanism. Thus, this area of storage memory device is hidden and not available as normal, accessible storage on the storage device.

At block 410, BIOS 109 exposes the address range for the Host Memory Buffer to the OS as SCM. In an embodiment, BIOS may use ACPI-defined mechanisms that expose the "virtual" NVDIMM (via NFITs) to the OS, as described in the ACPI v6.2 specification. At block 412, in an embodiment BIOS 109 may optionally load NVDIMM driver 127 complying with the UEFI version 2.7 specification, or later revisions, to expose the virtual NVDIMM to the BIOS (when UEFI-compatible) as an accessible storage device. Once the virtual NVDIMM is exposed, OS 111 may load SCM driver 125 at block 414 to provide the capability to access the SCM as a virtual NVDIMM. At block 416, OS 111 exposes the SCM as a visible file system for application(s) 117 to access. Subsequently, OS may read data from and write data to Host Memory Buffer 202 using SCM driver 125. In some examples, this may be in response to requests from application(s) 117 to read or write data from SCM as stored in the Host Memory Buffer.

As discussed above with reference to FIG. 3, on all computing platform power down and flush events storage device 120 copies all contents of Host Memory Buffer 202 to the hidden capacity area set aside on the storage device as backing store for Host Memory Buffer 204 using direct memory access (DMA) mechanisms as specified in the NVMe v.1.3 specification. This will maintain persistent data across power cycles. Additionally, in an embodiment any flush operation requested by the OS for file system durability may need to be translated to an equivalent command provided via the NVMe v.1.3 specification command set. Upon receipt of this command, a HMB-capable storage device 120 causes the volatile HMB data to be synchronized (e.g., copied) to the backing store for HMB on the storage device. In an embodiment, some steps may need to be taken by one or more of OS 111 or SCM driver 125 to ensure that attempted accesses to the NVDIMM address range during the flush operation are held up and queued until the flush operation is complete (to avoid data inconsistencies in the Host Memory Buffer).

In some examples, processes as shown in FIG. 3 and FIG. 4 depict processes to implement a virtual NVDIMM. For these examples, these processes may be implemented by or use components or elements of system 100 shown in FIG. 1 such as BIOS 109, application(s) 117, OS 111, SCM driver 125, NVDIMM driver 127, storage device driver 115, PCH 107, storage device 120, storage controller 124, memory 126, and/or storage memory device(s) 122. However, this process is not limited to being implemented by or use only these component or elements of system 100.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
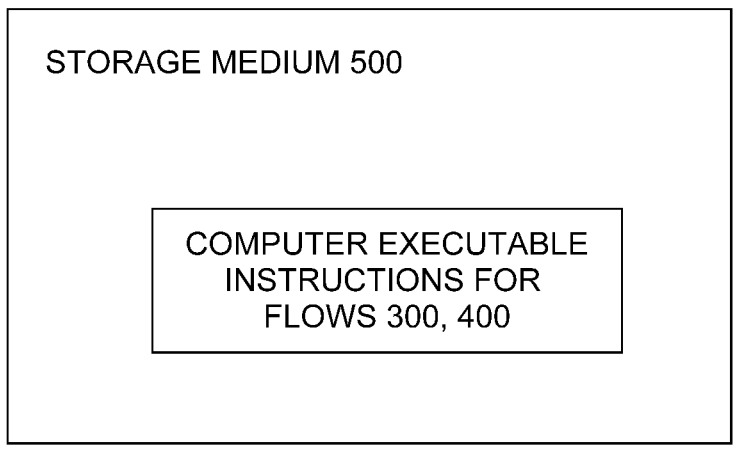
FIG. 5 illustrates an example storage medium.

FIG. 5 illustrates an example of a first storage medium. As shown in FIG. 5, the first storage medium includes a storage medium 500. The storage medium 500 may comprise an article of manufacture. In some examples, storage medium 500 may include any non-transitory computer readable medium or machine readable medium, such as an optical, magnetic or semiconductor storage. Storage medium 500 may store various types of computer executable instructions, such as instructions to implement logic flows 300 and 400. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 6 illustrates an example computing system that can perform NVM emulation using a processor semiconductor chip. According to some examples, computing system may include, but is not limited to, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, or combination thereof.

As observed in FIG. 6, the computing system 600 may include a processor semiconductor chip 601 (which may include, e.g., a plurality of general purpose processing cores 615_1 through 615_X) and a main memory controller (MC) 617 disposed on a multi-core processor or applications processor, system memory 602, a display 603 (e.g., touch-screen, flat-panel), a local wired point-to-point link (e.g., USB) interface 604, various network I/O functions 655 (such as an Ethernet interface and/or cellular modem subsystem), a wireless local area network (e.g., WiFi) interface 606, a wireless point-to-point link (e.g., Bluetooth (BT)) interface 607 and a Global Positioning System (GPS) interface 608, various sensors 609_1 through 609_Y, one or more cameras 650, a battery 611, a power management control unit (PWR MGT) 612, a speaker and microphone (SPKR/MIC) 613 and an audio coder/decoder (codec) 614. The power management control unit 612 generally controls the power consumption of the system 600.

An applications processor or multi-core processor 601 may include one or more general purpose processing cores 615 within processor semiconductor chip 601, one or more graphical processing units (GPUs) 616, a memory management function 617 (e.g., a memory controller (MC)) and an I/O control function 618. The general-purpose processing cores 615 execute the operating system and application software of the computing system. The graphics processing unit 616 executes graphics intensive functions to, e.g., generate graphics information that is presented on the display 603. The memory control function 617 interfaces with the system memory 602 to write/read data to/from system memory 602. The processor 601 may also include embedded NVRAM 619.

Each of the touchscreen display 603, the communication interfaces 604, 655, 606, 607, the GPS interface 608, the sensors 609, the camera(s) 610, and the speaker/microphone codec 613, and codec 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 601 or may be located off the die or outside the package of the applications processor/multi-core processor 601. The computing system also includes non-volatile storage 620 which may be the mass storage component of the system.

The components and features of computing platform 110 may be implemented using any combination of discrete circuitry, ASICs, logic gates and/or single chip architectures. Further, the features of computing platform 110 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing platform comprising:
a system memory device;
a non-volatile storage device;
circuitry coupled to the system memory device and the non-volatile storage device; and
logic for execution by the circuitry to emulate a non-volatile dual inline memory module (NVDIMM) in the computing platform, the logic to:

when a power up event occurs for the computing platform, a basic input/output system (BIOS) to: allocate a contiguous range of addresses of system memory for a host memory buffer, send the contiguous range of addresses to the non-volatile storage device, copy a backing store for the host memory buffer associated with the contiguous range of addresses of system memory from the non-volatile storage device to the host memory buffer in the system memory device, expose the contiguous address range of the host memory buffer as storage class memory (SCM) to an operating system (OS) of the computing platform, expose the SCM as a visible file system to an application of the computing platform, and make the backing store for the host memory buffer on the non-volatile storage device not available as normal, accessible storage to the OS and the application.

2. The computing platform of claim 1, the logic to:
when a power down event occurs for the computing platform, copy the host memory buffer from the system memory device to the corresponding backing store for the host memory buffer in the non-volatile storage device.

3. The computing platform of claim 1, the logic to:
when a flush event occurs for the computing platform, copy the host memory buffer from the system memory device to the corresponding backing store for the host memory buffer in the non-volatile storage device.

4. The computing platform of claim 1, the logic to:
read data from the host memory buffer and write data to the host memory buffer.

5. The computing platform of claim 1, wherein the non-volatile storage device comprises a solid-state drive (SSD) coupled to the circuitry over a non-volatile memory express (NVMe) interface.

6. The computing platform of claim 5, wherein the SSD comprises a 3-D cross-point memory device to store the corresponding backing store for the host memory buffer.

7. A method comprising:
when a power up event occurs for a computing platform emulating a non-volatile dual inline memory module (NVDIMM) by a basic input/output system (BIOS) by allocating a contiguous range of addresses of system memory for the host memory buffer, sending the contiguous range of addresses to the non-volatile storage device, copying a backing store for a host memory buffer associated with the contiguous range of addresses of system memory from the non-volatile storage device to the host memory buffer in the system memory device, exposing the contiguous address range of the host memory buffer as storage class memory (SCM) to an operating system (OS) of the computing platform, exposing the SCM as a visible file system to an application of the computing platform, and making the backing store for the host memory buffer on the non-volatile storage device not available as normal, accessible storage to the OS and the application.

8. The method of claim 7, comprising:
when a power down event occurs for the computing platform, copying the host memory buffer from the system memory device to the corresponding backing store for the host memory buffer in the non-volatile storage device.

9. The method of claim 7, comprising:
when a flush event occurs for the computing platform, copying the host memory buffer from the system memory device to the corresponding backing store for the host memory buffer in the non-volatile storage device.

10. The method of claim 7, comprising:
reading data from the host memory buffer and writing data to the host memory buffer.

11. A computing system comprising:
a system memory device;
a non-volatile storage device;
a basic input.output system (BIOS), coupled to the system memory device and to the non-volatile storage device, to emulate a non-volatile dual inline memory module (NVDIMM) in the computing system, the BIOS comprising logic to when a power up event occurs for the computing system, allocate a contiguous range of addresses of system memory for a host memory buffer, send the contiguous range of addresses to the non-volatile storage device, copy a backing store for the host memory buffer associated with the contiguous range of addresses of system memory from the non-volatile storage device to the host memory buffer in the system memory device, expose the contiguous address range of the host memory buffer as storage class memory (SCM) to an operating system (OS) of the computing platform, expose the SCM as a visible file system to an application of the computing platform, and make the backing store for the host memory buffer on the non-volatile storage device not available as normal, accessible storage to the OS and the application.

12. The computing system of claim 11, the BIOS logic to:
when a power down event occurs for the computing system, copy the host memory buffer from the system memory device to the corresponding backing store for the host memory buffer in the non-volatile storage device.

13. The computing system of claim 11, the BIOS logic to:
when a flush event occurs for the computing system, copy the host memory buffer from the system memory device to the corresponding backing store for the host memory buffer in the non-volatile storage device.

14. The computing system of claim 11, the BIOS logic to:
read data from the host memory buffer and write data to the host memory buffer.

15. The computing system of claim 11, wherein the non-volatile storage device comprises a solid-state drive (SSD) coupled to the circuitry over a non-volatile memory express (NVMe) interface.

16. The computing platform of claim 15, wherein the SSD comprises a 3-D cross-point memory device to store the corresponding backing store for the host memory buffer.

* * * * *